No. 785,536. PATENTED MAR. 21, 1905.
W. A. BADGER.
HAY SLING.
APPLICATION FILED DEC. 22, 1904.

Witnesses
C. Munk Jr.
C. H. Griesbauer.

Inventor
Walter Ambrose Badger
by H. B. Willson
Attorney

No. 785,536.  
Patented March 21, 1905.

UNITED STATES PATENT OFFICE.

WALTER AMBROSE BADGER, OF BELLEFONTAINE, OHIO, ASSIGNOR OF ONE-HALF TO PHILENA PEGG, OF QUINCY, OHIO.

HAY-SLING.

SPECIFICATION forming part of Letters Patent No. 785,536, dated March 21, 1905.

Application filed December 22, 1904. Serial No. 238,016.

*To all whom it may concern:*

Be it known that I, WALTER AMBROSE BADGER, a citizen of the United States, residing at Bellefontaine, in the county of Logan and State of Ohio, have invented certain new and useful Improvements in Hay-Slings; and I do declare the following to be a full, clear, and exact description of the invention, such as will enable others skilled in the art to which it appertains to make and use the same.

This invention relates to improvements in grain or hay slings.

The object of the invention is to provide a hay-sling so arranged that the ropes which hold the grain or hay will remain parallel, thereby preventing the loss of any hay or grain from the draft which is being hoisted or unloaded from the wagon.

Another object is to provide a sling the main cross-bar or spreader of which has a rope-holding device secured to each end, to which the ends of the sling-ropes are connected, means being provided and arranged whereby said releasing devices will be simultaneously actuated and without the necessity of the operator going beneath the draft.

With these and other objects in view the invention consists of certain novel features of construction, combination, and arrangement of parts, as will be hereinafter described and claimed.

Figure 1:
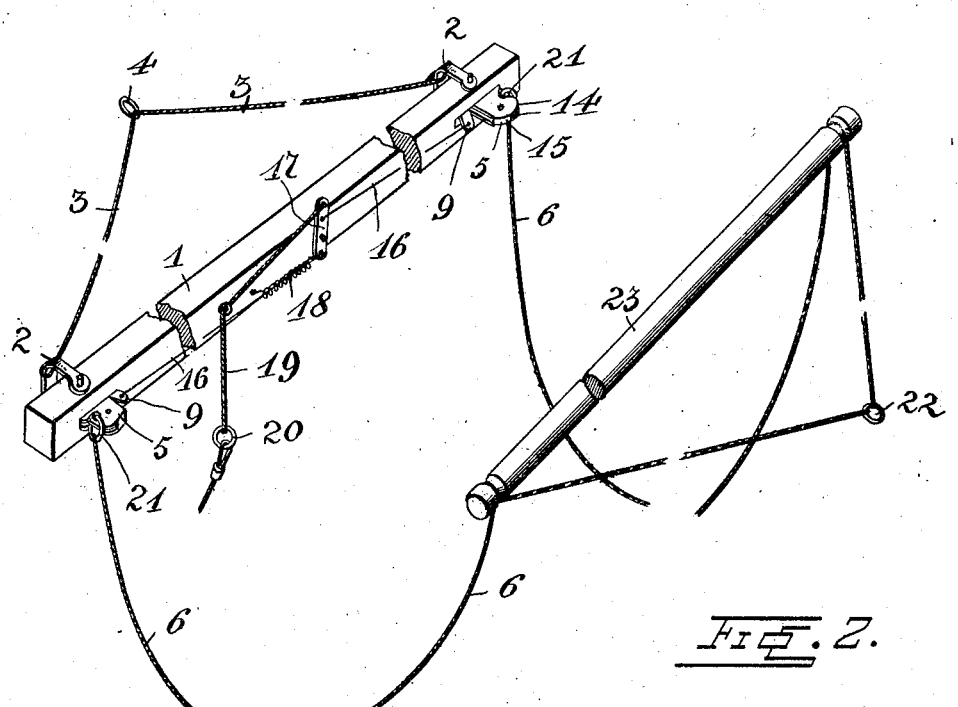
Figure 2:
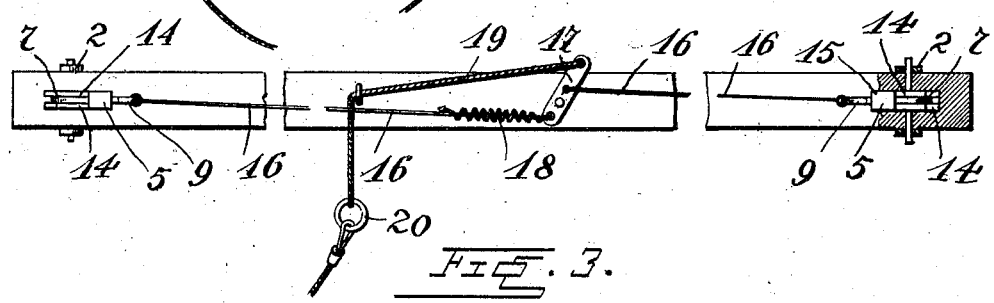
Figure 3:
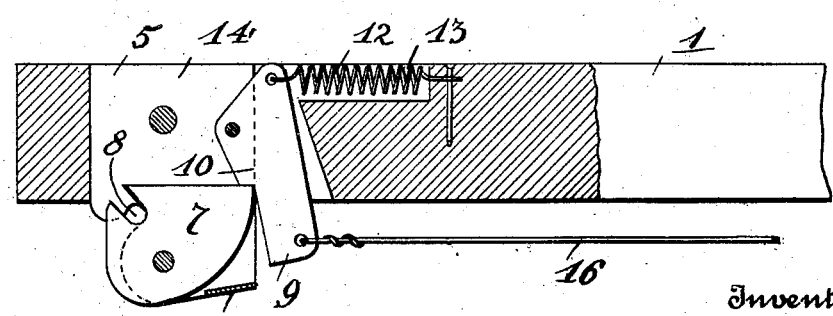

In the accompanying drawings, Figure 1 is a perspective view of a sling constructed in accordance with the invention. Fig. 2 is a side view of the main cross or spreader bar, on a larger scale, parts being broken away to more clearly disclose the construction of the parts; and Fig. 3 is a detail view of one of the rope-holding catches, one side of the same being removed to disclose the interior construction and arrangement of the parts.

Referring more particularly to the drawings, 1 denotes the main cross-bar or spreader, to each end of which is pivotally connected a bail-shaped clevis 2. To said clevises are connected the ends of a short sling-rope 3, to the central portion of which is connected a ring 4, whereby the same may be attached to a hoisting device. (Not shown.)

In each end of the spreader-bar 1 is arranged a casing 5, containing a latch mechanism, with which is adapted to be connected the end of long sling-ropes 6. The latch mechanism preferably consists of a hook 7, pivotally mounted in the casing 5, the bail of said hook being arranged to coact with recesses 8, formed in the adjacent edges of the casing 5.

Pivotally mounted between the side plates of the casing 5 is a locking-pawl 9, having formed in one side thereof a notch or shoulder 10, which is adapted to engage a corner of the hook 7, thereby holding said hook in an operative or closed position. With the lower end of the pawl 9 is connected a coil-spring 12, which is seated within a recess 13, formed in the bar 1, the opposite end of said spring being connected to said bar, whereby the tension of the spring will be inserted to normally throw the pawl 9 into engagement with the hook 7.

The casings 5 are preferably formed of parallel side plates 14, which are open around the edges of the same to permit the free movement inwardly and outwardly between the same of the hook 7 and pawl 9, a short section of flange 15 being arranged at one edge of the casing to space said plates apart and to limit the movement of the hook 7 in either direction.

To the free end of the pawls 9 is connected one end of releasing-rods 16, the opposite ends of which are pivotally connected to a releasing-lever 17, which is pivotally connected to the side of the cross-bar or spreader 1. Said rods are connected to the lever 17 above and below the pivotal connection of the same, whereby when said lever is moved said rods will be drawn inwardly, thus simultaneously releasing the pawls 9 from engagement with the hooks 7, thereby permitting said hooks to open.

A coil-spring 18 is connected to the inner end of the lever 17 and to the bar 1 to return said lever to its normal position after being operated. To the outer long end of the releasing-lever 17 is loosely connected the inner end of a short operating cord or rope 19, which is adapted to pass through an eye arranged on the bar 1 midway between the ends of the same. Said cord or rope has connected to its end a ring or link 20, to which is adapted to be attached the end of an operating-rope held by the operator and by which the pawls 9 are disengaged from the hooks 7.

With the hooks 7 are adapted to be connected the ends of the long sling-ropes 6, and connected thereto are rings 21, whereby the same are connected with the hooks 7, the opposite end of said ropes being provided with rings 22, by which the same are connected to the hoisting devices. Arranged between the ropes 6 at a suitable distance from the rings 22 is a supplemental spreader-bar 23, whereby said ropes are held apart in parallel relation, so that the hay or grain with which said ropes are engaged will be firmly held and prevented from falling out when being hoisted from the wagon.

In using the device the main spreader or cross bar and sling-ropes are arranged in the bottom of the wagon, the sling-ropes being preferably of such length as to extend but half the length of the wagon-body. The short sling-ropes 3 are supported upon a removable standard which is arranged within the body of the wagon at the center of the same, with the long sling-ropes running parallel along the bottom in opposite directions each way from said central standard, it being understood that four slings are used in each set. Two slings are used in the bottom of each wagon-body, one on each side of said central standard and extending from the same toward the front and rear of the wagon-body. After sufficient grain or hay has been placed in the wagon and on or in the two bottom slings the two upper slings of the set are then arranged on this grain or hay, said second sections of slings being arranged in a similar manner to the first section. By this arrangement one-fourth of the wagon-load will be carried by each sling, which will permit the draft of hay or grain carried by the slings to be raised higher, thus facilitating the passage of the same over the higher beams of the barn into which the hay or grain is being placed, which greatly aids in handling or unloading said hay or grain. The employment of half-length slings for each wagon permits the operator to stand upon one end of the load while the opposite end of the load is being hoisted, thereby obviating the necessity of his climbing on and off the wagon. This arrangement of the slings also permits a tighter grasp of the hay or grain by the sling-ropes, and the slings do not roll the hay or grain, as the longer styles of slings always do.

The arrangement of the short releasing-cord permits the operator to attach his releasing-cord to the device without going beneath the hoisted load, thereby relieving him of the possible danger from the dropping of said load.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a hay or grain sling, the combination with a main cross-bar or spreader having arranged on each end a clevis, of short sling-ropes connected to said clevises, spring-latches arranged on the ends of said spreader, said latches consisting of a casing, a hook pivotally mounted in said casing, a spring-projected locking-pawl adapted to engage said hook and lock the same in a closed position, long, parallelly-disposed sling-ropes, adapted to be engaged with said hooks, a pivotally-mounted releasing-lever, releasing-rods connecting said locking-pawls with said lever, one above and the other below the pivotal point of the latter, and means whereby an operating-rope may be connected with said releasing mechanism without the necessity of the operator going beneath the draft, substantially as described.

2. In a hay or grain sling, the combination with a main cross-bar or spreader having arranged on each end a clevis, of short sling-ropes connected to said clevises, spring-latches arranged on the ends of said spreader, said latches consisting of a casing, a hook pivotally mounted in said casing, a spring-projected locking-pawl adapted to engage said hook and lock the same in a closed position, long, parallelly-disposed, sling-ropes adapted to be engaged with said hooks, a pivotally-mounted spring-retracted operating-lever, releasing-rods connecting said locking-pawls with said lever, one above and the other below the pivotal point of the latter, a short rope or cable connected to said operating-lever, and means whereby an operating-cable may be attached to said short rope by the operator on the load, substantially as described.

3. In a hay or grain sling, the combination with a main cross-bar or spreader, having arranged on each end a clevis, of short sling-ropes connected to said clevises, a hoisting-ring connected to the opposite ends of said ropes, spring-latches arranged on the ends of said spreader, long sling-ropes having secured to one of their ends rings whereby the same are attached to said latches, rings secured to their opposite ends whereby they may be secured to a hoisting device, a supplemental spreader-bar arranged between said ropes to hold the same in parallel relation, where they engage the load, a double-acting releasing-lever, means whereby the same is connected to said latches, and means whereby said lever is operated from the load, substantially as described.

In testimony whereof I have hereunto set my hand in presence of two subscribing witnesses.

WALTER AMBROSE BADGER.

Witnesses:
    JAS. M. EBRITE,
    JOHN R. CASSIDY.